(12) United States Patent
Grasso et al.

(10) Patent No.: US 9,630,591 B2
(45) Date of Patent: Apr. 25, 2017

(54) DEVICE FOR A VEHICLE WINDOW WIPER ARM

(71) Applicant: Valeo Systèmes d'Essuyage, Le Mesnil Saint Denis (FR)

(72) Inventors: Giuseppe Grasso, Le Breuil sur Couze (FR); Denis Thebault, Clermont Ferrand (FR); Michael Schaeuble, Vaihingen/enz (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 14/870,688

(22) Filed: Sep. 30, 2015

(65) Prior Publication Data
US 2016/0096510 A1 Apr. 7, 2016

(30) Foreign Application Priority Data
Oct. 2, 2014 (EP) .................................... 14306556

(51) Int. Cl.
*B60S 1/40* (2006.01)
*B60S 1/52* (2006.01)
*B60S 1/04* (2006.01)

(52) U.S. Cl.
CPC .......... *B60S 1/0491* (2013.01); *B60S 1/4038* (2013.01); *B60S 1/4048* (2013.01); *B60S 1/522* (2013.01)

(58) Field of Classification Search
CPC .......... B60S 1/522; B60S 1/524; B60S 1/526; B60S 1/528
USPC ..................................................... 15/250.04
See application file for complete search history.

(56) References Cited

U.S. PATENT DOCUMENTS

| | | | | | |
|---|---|---|---|---|---|
| 3,428,992 | A | * | 2/1969 | Di Giorgio | B60S 1/522 15/250.04 |
| 3,458,888 | A | * | 8/1969 | Carpenter | B60S 1/524 137/832 |
| 3,757,379 | A | * | 9/1973 | Benson | B60S 1/524 15/250.04 |
| 3,790,083 | A | * | 2/1974 | Redifer | B05B 1/10 15/250.04 |
| 3,793,670 | A | * | 2/1974 | Riester | B60S 1/522 15/250.04 |
| 3,854,161 | A | * | 12/1974 | Benson | B60S 1/524 15/250.04 |

(Continued)

FOREIGN PATENT DOCUMENTS

DE 3639537 A1 6/1988
DE 10 2007 062304 A1 6/2009
(Continued)

OTHER PUBLICATIONS

DE102013208576A1 (machine translation), 2013.*
Extended European Search Report issued in corresponding European Application No. 14306556.3, mailed on Mar. 23, 2015 (5 pages).

*Primary Examiner* — Andrew A Horton
(74) *Attorney, Agent, or Firm* — Osha Liang LLP

(57) ABSTRACT

Device (140) for a window wiper arm of a vehicle, in particular a motor vehicle, characterized in that it comprises a cover (144) and an accessory, such as a nozzle (142), which is rigidly connected to the cover, said cover having a generally U-shaped cross section and being configured to be applied and fastened to an end piece (28) of U-shaped cross section of said arm.

8 Claims, 10 Drawing Sheets

(56) References Cited

U.S. PATENT DOCUMENTS

| | | | | |
|---|---|---|---|---|
| 3,940,068 | A * | 2/1976 | Mohnach | B05B 1/14 15/250.04 |
| 4,516,288 | A * | 5/1985 | Fizyta | B60S 1/522 15/250.04 |
| 5,842,251 | A * | 12/1998 | LeFrançois | B60S 1/3497 15/250.04 |
| 6,094,772 | A * | 8/2000 | West | B60S 1/3415 15/250.04 |
| 8,381,348 | B2 * | 2/2013 | Egner-Walter | B60S 1/381 15/250.04 |
| 2002/0000481 | A1 * | 1/2002 | Utz | B60S 1/522 239/284.1 |
| 2003/0009841 | A1 * | 1/2003 | Sato | B60S 1/522 15/250.04 |
| 2003/0177599 | A1 * | 9/2003 | Wilson | B60S 1/38 15/250.04 |
| 2007/0018012 | A1 * | 1/2007 | Harris | B05B 1/00 239/284.1 |
| 2008/0155776 | A1 * | 7/2008 | Harita | B60S 1/524 15/250.04 |
| 2013/0036569 | A1 * | 2/2013 | Caillot | B60S 1/32 15/250.04 |
| 2013/0139342 | A1 * | 6/2013 | Egner-Walter | B60S 1/524 15/250.04 |
| 2013/0205531 | A1 * | 8/2013 | Espinasse | B60S 1/38 15/250.04 |
| 2013/0269139 | A1 * | 10/2013 | Wolfgarten | B60S 1/32 15/250.03 |
| 2013/0291328 | A1 * | 11/2013 | Schmid | B60S 1/3805 15/250.04 |
| 2014/0047661 | A1 * | 2/2014 | Bousset | B60S 1/524 15/250.04 |
| 2014/0115807 | A1 * | 5/2014 | Bousset | B60S 1/524 15/250.04 |
| 2014/0224901 | A1 * | 8/2014 | Bousset | B60S 1/522 239/284.1 |
| 2015/0344000 | A1 * | 12/2015 | Kruse | B60S 1/522 134/34 |

FOREIGN PATENT DOCUMENTS

| | | |
|---|---|---|
| DE | 102012224474 A1 | 7/2014 |
| DE | 102013208576 A1 | 7/2014 |
| EP | 2505440 A2 | 10/2012 |
| WO | 2014102061 A1 | 7/2014 |

* cited by examiner

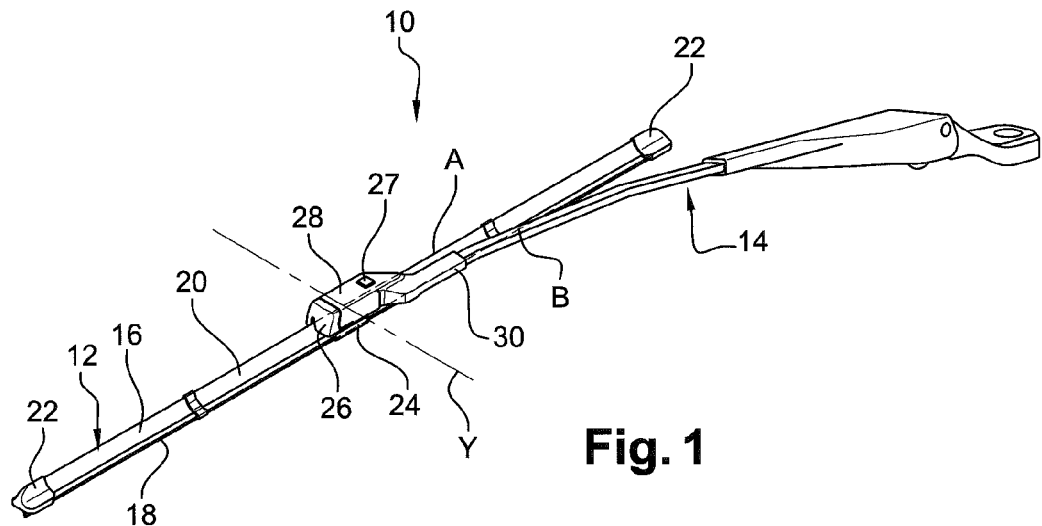
Fig. 1
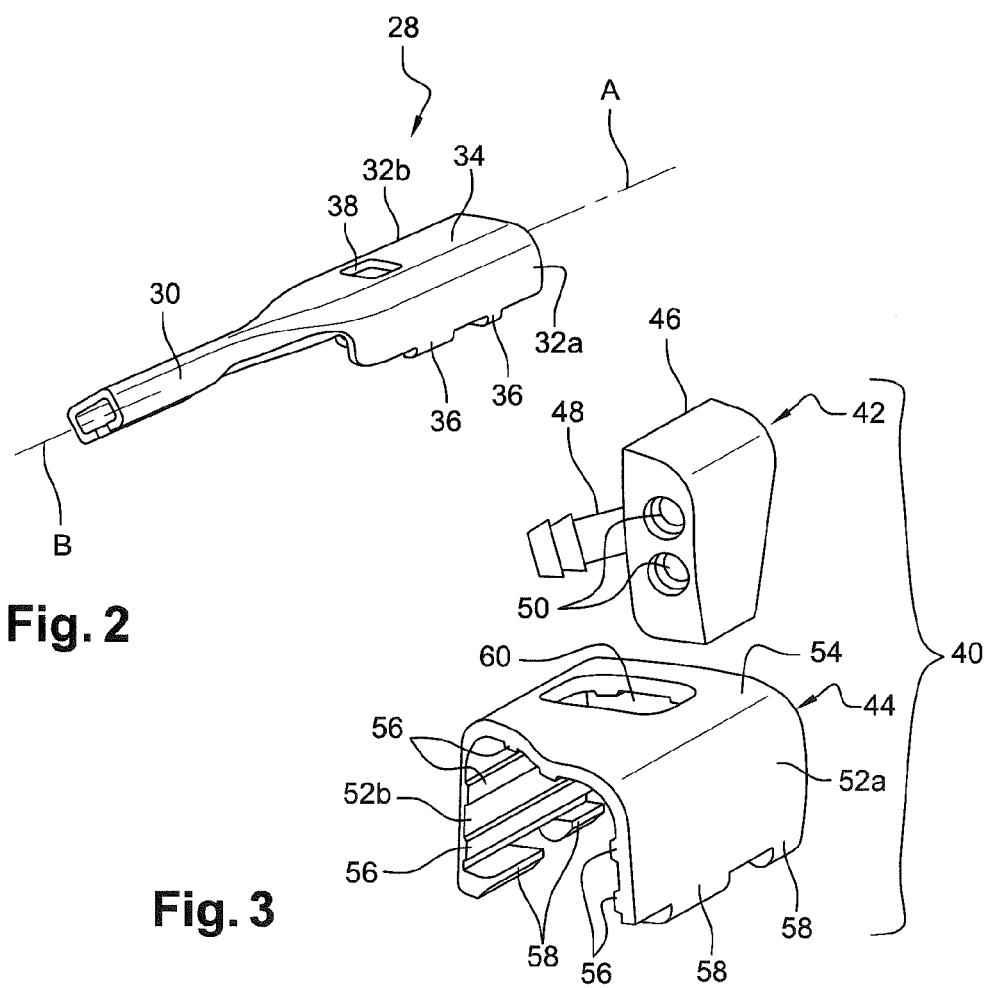
Fig. 2
Fig. 3

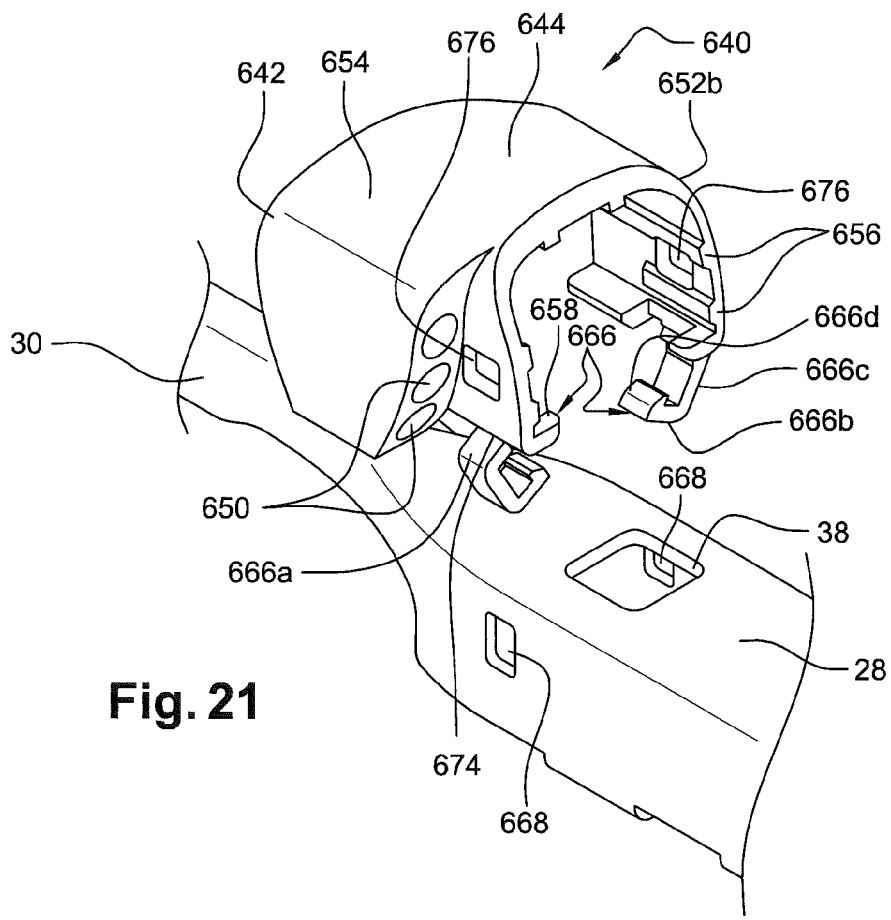
Fig. 21
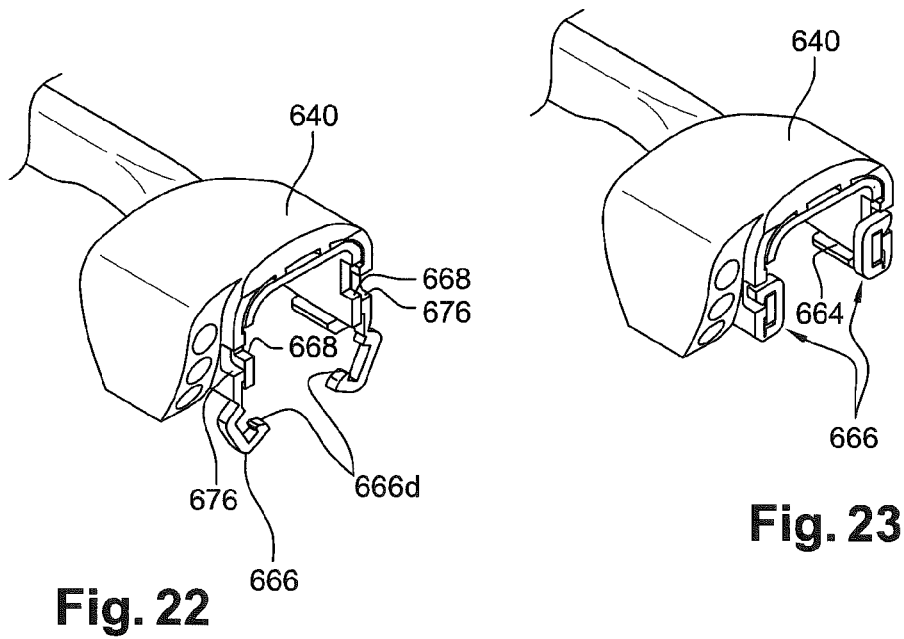
Fig. 22
Fig. 23

DEVICE FOR A VEHICLE WINDOW WIPER ARM

The present invention relates to a device for a window wiper arm of a vehicle, in particular a motor vehicle, this arm being of the type comprising an end piece of U-shaped cross section in particular for connecting the arm to a window wiper blade.

A motor vehicle is conventionally equipped with window wipers to wash the windscreen and prevent the driver's vision of his/her surroundings from being impaired. These window wipers generally comprise a driving arm, which performs an angular back-and-forth movement, and elongate blades, which for their part bear scraping edges made of a resilient material. These scrapers rub against the windscreen and carry away the water by removing it from the driver's field of vision. The blades are produced in the form of either, in a conventional version, hinged brackets which hold the scraping edge at a plurality of discreet locations by bending said edge so as to match any curvature in the windscreen, or, in a version more recently labelled the "flat blade", a semi-rigid assembly that maintains the scraping edge along its entire length by means of one or more bending vertebra allowing the blade to be applied to the windscreen without the need to use brackets.

In both solutions, the blade is attached to the driving arm by a fastener composed of a connector and an adapter. The connector is a part that is directly fastened onto either the scraping edge or the flat blade, whereas the adapter is an intermediate piece allowing the connector to be connected and fastened to the driving arm. The two parts are interconnected by a transverse hinge pin allowing their relative rotation in a plane that is perpendicular to the windscreen and passes through the arm. The adapter is further configured for engagement in a head or end piece in the form of a cap of the driving arm.

The window wipers may comprise accessories such as means for spraying window-cleaning liquid onto the windscreen. These spraying means may be located on the bonnet, on the grille of the windscreen bay or, in a more recent version, on the window wipers; for example, it is known to provide such spraying means on the window wiper blades or even on their driving arms. In this case, the window-cleaning liquid is carried as far as the spraying means by ducts that are fastened to the arms and connected to a pump and to a reservoir, which are generally housed under the bonnet of the vehicle.

The present invention proposes a simple, efficient and cost-effective improvement to this technology and relates in particular to means for fastening an accessory which are specially designed to cooperate with an end piece of U-shaped cross section of a window wiper arm.

The present invention relates to a device for a window wiper arm of a vehicle, in particular a motor vehicle, characterised in that it comprises a cover and an accessory, such as a nozzle, which is rigidly connected to the cover, said cover having a generally U-shaped cross section and being configured to be applied and fastened to an end piece of U-shaped cross section of said arm.

In the present application, the term "accessory" refers to a functional means; that is, a means performing at least one function, for example an electrical, hydraulic or pneumatic function. Advantageously, the accessory performs more than just a mechanical function. The accessory is preferably a nozzle; that is, a means for spraying window-cleaning liquid in particular.

Furthermore, the term "device" refers to the combination of the accessory plus its fastening means, which in this case comprise a U-shaped cover. According to the invention, the cover is configured to be applied and fastened to the U-shaped end piece of the arm. Preferably, it is configured to be installed straddling the end piece, for example by resilient latching and/or by form-fitting.

The device may comprise one or more of the following features, taken in isolation from one another or in combination with one another:
- said cover may comprise a through-hole that is configured for alignment with an opening in said arm;
- the device comprises arresting means that are configured to cooperate with said end piece of the arm and/or with another element borne by the arm;
- said arresting means are arresting means in the longitudinal and transverse directions;
- said arresting means are configured to cooperate with an adapter that is borne by the arm and engaged in the end piece of the arm;
- said arresting means comprise hooks and/or pins and/or tabs;
- at least some of said hooks (pins and/or tabs) have a generally L- or U-shaped cross section;
- at least some of said hooks (pins and/or tabs) are located at a lower end of the cover;
- at least some of said pins (hooks and/or tabs) are configured to pass through holes of a complementary shape in the end piece, the pins having a generally cylindrical or parallelepiped shape, for example;
- at least some of said hooks and/or of said tabs are resiliently deformable and are, for example, configured to cooperate by resilient latching with complementary means of the end piece of the arm;
- at least some of said hooks and/or of said tabs are of the type that can be retracted from a position for locking the device with respect to the end piece to an unlocking position;
- at least some of said hooks and/or of said retractable tabs are connected to said cover by a thin film of material forming a hinge;
- said cover comprises two lateral walls that are substantially parallel and interconnected by an upper transverse wall;
- said through-hole is formed in said upper transverse wall;
- said lateral walls of the cover each have a front peripheral edge that is substantially convexly curved inward;
- said arresting means are located on said lateral walls and, for example, on lower longitudinal edges of these lateral walls;
- said lateral walls comprise through-slits that extend, for example, in at least one plane that is substantially perpendicular to said lateral walls; and
- said lateral walls of the cover are resiliently deformable, for example in flexure.

The present invention also relates to a window wiper arm for a vehicle, in particular a motor vehicle, comprising an end piece of U-shaped cross section, characterised in that it carries at least one device, as described above, that is applied and fastened to said end piece.

Advantageously, the blade carries an adapter that is engaged in the end piece of the arm, said arresting means of the device cooperating with complementary means of the adapter to lock the device on the end piece for as long as the adapter is installed in the end piece.

The present invention also relates to a method for installing a device as described above onto a window wiper arm for a vehicle, in particular a motor vehicle, this arm comprising an end piece of U-shaped cross section, characterised in that it comprises a step of spreading lateral walls of the cover of the device and of installing the device on the end piece, so as to be installed straddling said end piece, the method possibly comprising a step of connecting the accessory, particularly where said accessory is a nozzle.

The invention will be better understood, and other details, features and advantages thereof will become apparent, upon reading the following description provided by way of non-limiting example with reference to the accompanying drawings, in which:

FIG. 1 is a schematic perspective view of window wiper according to the invention;

FIG. 2 is a schematic perspective view on a larger scale of the end piece of the window wiper arm in FIG. 1;

FIG. 3 is a schematic perspective view of a device according to the invention, which is disassembled here;

FIGS. 21 to 23 are schematic perspective views of an end piece of a window wiper arm and of a sixth embodiment of a device according to the invention;

Figure 4:
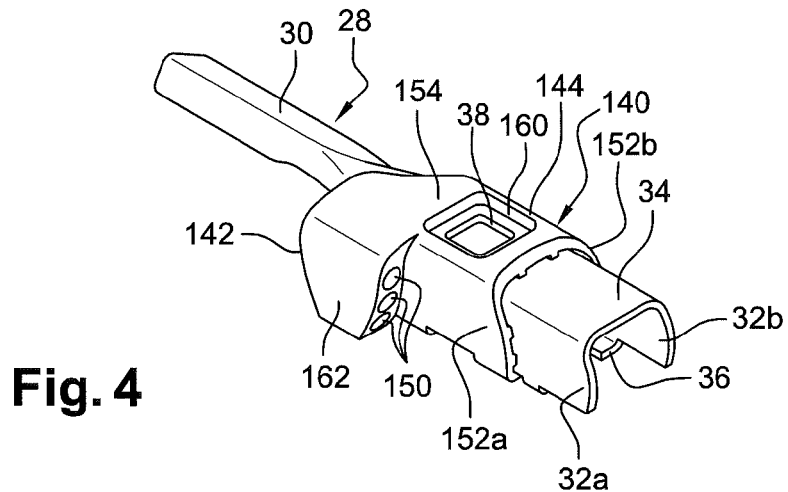
FIG. 4 is a schematic perspective view of an end piece of a window wiper arm and of a first embodiment of a device according to the invention.

It should be noted that the figures show the invention in a detailed manner so that the invention may be carried out; said figures may, of course, be used to better define the invention where necessary.

In the description that follows, the terms "longitudinal" and "lateral" refer to the orientation of the window wiper blade or of the driving arm. The longitudinal direction corresponds to the main axis of the blade or of the arm in which it extends, whereas the lateral orientations correspond to concurrent straight lines; that is, straight lines that intersect the longitudinal direction, in particular those perpendicular to the longitudinal axis of the blade or of the arm in its plane of rotation. As regards the longitudinal directions, the terms "outer" and "inner" are to be understood relative to the point at which the blade is fastened to the arm, the term "inner" corresponding to the portion where the arm and a half-blade extend, or relative to the point at which the arm is fastened to the vehicle. The directions referred to as "upper" and "lower" correspond to orientations perpendicular to the plane of rotation of the window wiper blade, the term "lower" including the plane of the windscreen. Finally, the term "horizontal" refers to one or more planes that are substantially parallel to the plane of the windscreen, and the term "vertical" refers to one or more planes that are substantially perpendicular to the plane of the windscreen.

FIG. 1 shows a window wiper 10 comprising in particular a blade 12 and an arm 14 for driving the blade 12.

The blade 12 is preferably a flat blade and comprises a longitudinal body 16, a wiping edge 18, generally made of rubber, and at least one vertebra (not shown) which reinforces the wiper and facilitates its application on a vehicle windscreen.

The body 16 of the blade 12 may comprise an upper aerodynamic deflector 20 for improving operation of the wiping system, the aim of this deflector being to improve application of the blade on the windscreen and thus the aerodynamic performance of the window wiper.

The blade 12 may further comprise end fittings 22 or clips for hooking the scraper 18 and the vertebra onto the body 16, these end fittings 22 being located at each of the longitudinal ends of the body 16.

The blade 12 comprises an intermediate connector 24 substantially at its centre. An adapter 26 that is rigidly connected to the arm 14 is installed on the connector 24 so as to maintain a degree of freedom as it pivots about a pivot axis Y, which is a transverse axis substantially perpendicular to the longitudinal axis of the blade 12. This degree of freedom allows the blade 12 to pivot relative to the arm 14 and thus allows the blade to follow the curvature of the windscreen as its moves. The adapter 26 can be detached from the arm 14 by pressing on a push button 27 borne by the adapter.

The arm 14 is intended to be driven by a motor to follow an angular back-and-forth movement making it possible to carry away water and possibly other undesirable elements covering the windscreen. The adapter 26 joins the blade 12 to the arm 14 and in particular to a head or end piece 28 of the arm, which may be formed in one piece with the arm or applied to and fastened thereon.

The end piece 28 of the arm (which can be seen more clearly in FIG. 2) forms a cap of substantially U-shaped cross section.

The end piece 28 has an elongated shape of which the axis of elongation A is generally substantially parallel to the axis of elongation or the longitudinal axis of the blade 12. The end piece 28 comprises a portion 30 to be connected to the rest of the arm 14, for example by crimping. This portion 30 has a generally elongated shape and extends along an axis B that is substantially parallel to the axis A and at a spacing from said axis, as can be seen in FIGS. 1 and 2. The portion 30 is connected to a rear or inner end of the rest of the end piece 28.

The end piece 28 comprises two lateral longitudinal walls 32a, 32b of which the upper longitudinal edges are interconnected by an upper transverse wall 34. The walls 32a, 32b, 34 define between them a space for housing the adapter 26. At their lower longitudinal edges, the walls 32a, 32b comprise means 36, such as hooks, for holding the adapter 26 in the aforesaid space.

The upper wall 34 comprises a through-opening 38 of a complementary shape to the push button 27. In the installation position, the push button 27 is housed in this opening 38 and may pass therethrough so as to project onto the upper face of the wall 34. The push button 27 is installed in the opening 38 by simple engagement or nesting.

FIG. 3 shows a device 40 according to the invention, this device 40 comprising in essence two elements, namely an accessory, which is a nozzle 42 in this case, and a cover 44 for fastening the nozzle to the end piece 28 of the arm.

The nozzle 42 and the cover 44 are detached from each other in this case but are intended to be rigidly interconnected, preferably prior to their installation on the arm 14. They can be made of any material, for example plastics material. They can be fastened to each other by any means, for example by gluing or welding, for instance by ultrasonic welding.

Figure 7:
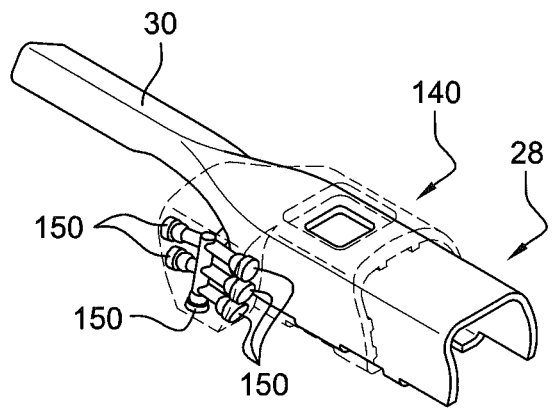
Figure 8:
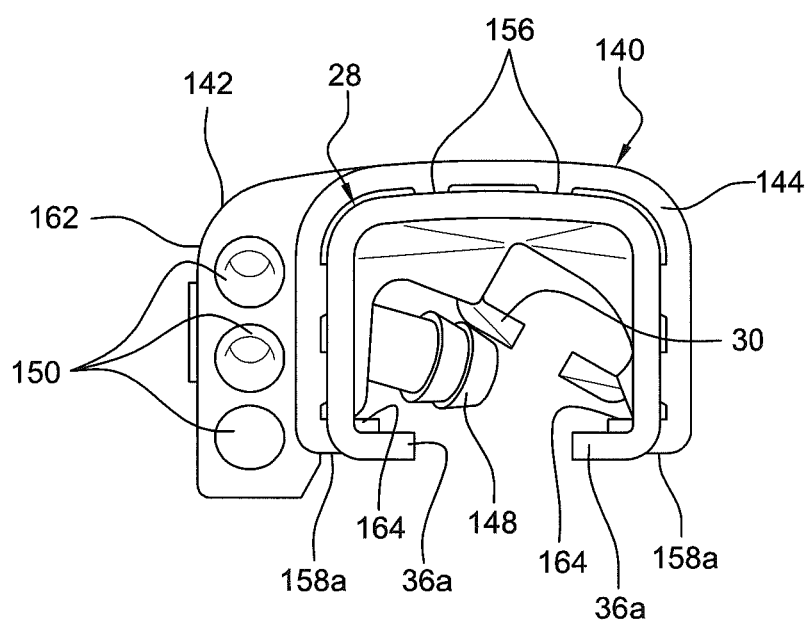

The nozzle 42 comprises a body 46 of generally parallelepiped shape, for example, and a connection cannula 48. The body 46 comprises at least one hole 50 (two in this case) for spraying window-cleaning liquid. The holes 50 are connected to the cannula 48 by inner ducts which cannot be seen in FIG. 3 but are shown transparently in the embodiment in FIG. 7. The cannula 48 comprises a male end fitting for engagement in one end of a flexible tube, of which the other end is connected to a pump and to a window-cleaning liquid reservoir of the vehicle equipped with the window wiper. The tube extends along part of the arm and can be fastened thereto by appropriate means. The holes 50 are in this case located on at least one face of the body 46 of the nozzle 42. The body of the nozzle 42 might, however, comprise holes 50 on two or three faces of the nozzle, as can be seen in FIG. 7. This allows the window-cleaning liquid to be atomised in a plurality of different directions and thus separate zones to be defined at which the liquid strikes the windscreen of the vehicle.

In cross section, the cover 44 of the nozzle 42 is generally U-shaped, this shape being substantially complementary to that of the end piece 28 of the arm.

The cover 44 has an elongated shape and comprises two lateral longitudinal walls 52*a*, 52*b* of which the upper longitudinal edges are interconnected by an upper transverse wall 54. The walls 52*a*, 52*b*, 54 define between them a space for receiving the end piece 28. The cover 44 is in fact intended in this case for installation by straddling the end piece 28, such that its upper wall 58 rests substantially on the upper wall 34 of the end piece and that its lateral walls 52*a*, 52*b* rest substantially on the lateral walls 32*a*, 32*b* of the end piece. On their faces oriented toward the end piece 28, the walls 52*a*, 52*b*, 54 may comprise longitudinal ribs 56 for resting on the walls 32*a*, 32*b*, 34 of the end piece.

The walls 52*a*, 52*b*, 54 of the cover 44 are thus dimensioned to allow this installation. The wall 54 has a larger width or transverse dimension than that of the wall 34. Preferably, said wall has a smaller length or longitudinal dimension than that of the wall 34, as can be seen in particular in the embodiment in FIG. 4. The walls 52*a*, 52*b* have larger heights or vertical dimensions than those of the walls 32*a*, 32*b*. These walls 52*a*, 52*b* comprise means 58 for arresting the device 40 on the end piece 28.

The upper wall 54 comprises a through-hole 60 that is intended for alignment with the opening 38 in the end piece 28, as can be seen in the embodiment in FIG. 4, so as to make accessible the push button 27 of the adapter 26. The hole 60 may have larger (in particular longitudinal and transverse) dimensions than those of the opening 38.

All the embodiments described in the following comprise the aforesaid features relating to the device 40, with the exception, in some cases, of those relating to the hole 60.

Reference is now made to FIGS. 4 to 8, which show a first embodiment of the invention. As indicated in the foregoing, the device 140 in FIGS. 4 to 8 comprises the features of the device 40, which features will therefore not be described in more detail in the following.

The nozzle 142 is in this case arranged and fastened at the rear or inside and on one side of the cover 144. Here it comprises a plurality of holes 150 for spraying liquid, which extend in substantially the same plane substantially parallel to the lateral wall 152*a* of the cover 144, to which wall the nozzle is connected. The nozzle 142 extends over substantially the entire height of the cover 144 and is located on the opposite side to the aforesaid portion 30 of the end piece 28. The nozzle 142 comprises an outer lateral face 162 that is substantially parallel to the wall 152*a* and on which a special marking can be provided, such as the brand name of the manufacturer or retailer (marked in relief here).

The device 140 is installed on the end piece 28 of the arm such that the front or outer edges of its walls 152*a*, 152*b*, 154 are set back relative to those of the walls 32*a*, 32*b*, 34 of the end piece 28. It can be seen in FIG. 4 in particular that the profiles of the front edges of the walls 152*a*, 152*b*, 32*a*, 32*b* are substantially identical, these edges being substantially convexly curved inward.

Figure 5:
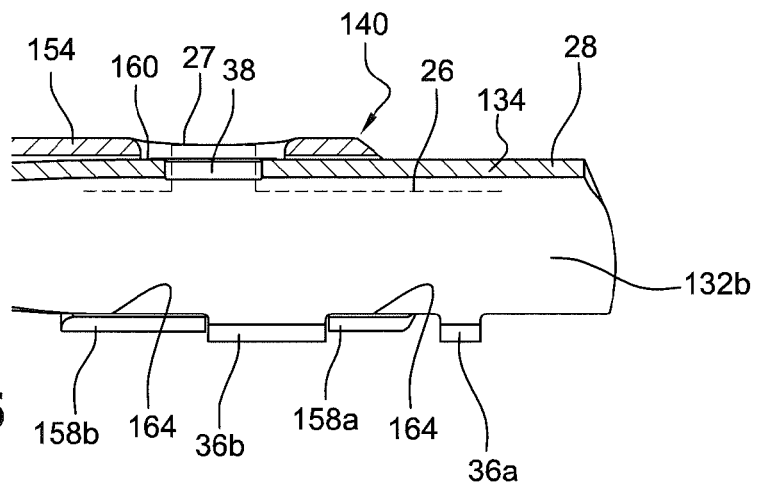
FIG. 5 is a longitudinal section of the end piece and of the device along line V-V in FIG. 4.

As can be seen in FIG. 5, the hole 160 in the cover 144 can be provided for the push button 27 of the adapter 26 to pass through at least in part, which push button is schematically shown here by dotted lines.

Figure 6:
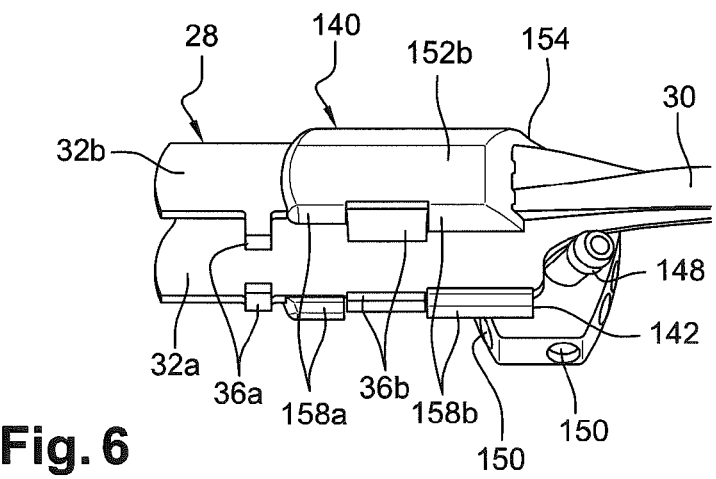
FIGS. 6 to 8 are other schematic perspective views of the end piece and of the device in FIG. 4.

FIGS. 6 and 7 shows in particular that the cannula 148 extends rearward and slightly downward from the nozzle 142. Its free end is located substantially below the front or outer end of the portion 30 of the end piece 28.

The aforesaid means 158 for arresting the device 140 on the end piece 28 comprise hooks 158*a*, 158*b* in this case. Each lateral wall 152*a*, 152*b* comprises two hooks here, namely a front hook 158*a* and a rear hook 158*b*. The hooks are located at the lower ends of the walls 152*a*, 152*b*. More precisely, the wall 152*a* comprises two hooks—a front hook 158*a* and a rear hook 158*b*—at its lower longitudinal edge. The hooks 158*a*, 157*b* of one wall 152*a*, 152*b* are substantially symmetrical relative to those of the other wall 152*b*, 152*a*, relative to a central longitudinal plane of the cover that is substantially parallel to the walls 152*a*, 152*b*.

Each hook 158*a*, 158*b* of one wall 152*a*, 152*b* is defined by a longitudinal ledge that extends from the side of the other wall 152*b*, 152*a*. Each hook comprises an upper bearing face 164.

The front hooks 158*a* are at a spacing from the rear hooks 158*b*. The front hooks in this case have a smaller length or axial dimension than that of the rear hooks.

The hooks 158*a*, 158*b* are intended for engagement under the walls 32*a*, 32*b* of the end piece such that their bearing faces 164 cooperate with the lower longitudinal edges of these walls 32*a*, 32*b*.

As can be seen in FIG. 5 in particular, the lateral walls 32*a*, 32*b* of the end piece 28 extend substantially without play between the wall 154 and the hooks 158*a*, 158*b* of the device 140. This means that the device 140 can be arrested on the end piece in the upward and downward transverse direction. It is the cooperation of the walls 152*a*, 152*b* of the cover with those 32*a*, 32*b* of the end piece that arrests the device 140 on either side of the end piece in the transverse direction.

As described in the foregoing, at their lower longitudinal edges, the walls 32*a*, 32*b* of the end piece comprise hooks 36 for holding the adapter. At least some of these hooks can be used to arrest the device 140 on the piece 28 in the forward and backward longitudinal direction.

In the example shown, there are four hooks 36. Each wall 32*a*, 32*b* comprises two hooks: a front hook 36*a* and a rear hook 36*b*. The hooks 36*a*, 36*b* of one wall 32*a*, 32*b* are substantially symmetrical relative to those of the other wall 32b, 32a, relative to a central longitudinal plane of the piece 28 that is substantially parallel to the walls 32a, 32b.

Each hook 36a, 36b of one wall 32a, 32b is defined by a longitudinal ledge that extends on the side of the other wall 32b, 32a. The front hooks are at a distance from the rear hooks. The front hooks in this case have a smaller length or axial dimension than that of the rear hooks.

Each hook 36b is intended to extend between the two hooks 158a, 158b of a wall 152a, 152b and is of a length that is substantially equal to the longitudinal distance between the hooks 158a, 158b such that, in the installation position, the hook 152a rests substantially via its rear end on the front end of the hook 36b, and that the hook 152b rests via its front end on the rear end of the hook 36a, as can be seen in FIG. 6.

The device 140 can be fastened to the end piece 28 by spreading the lateral walls 152a, 152b of its cover 144 and then by installing the device on the end piece until its upper wall 154 comes to rest, for example via its ribs 156, on the wall 34 of the piece 28. The force exerted on the device 140 to bring about the aforesaid spreading is then released so that its lateral walls 152a, 152b can come to rest, for example via their ribs 156, on the walls 32a, 32b of the piece 28, and that their hooks 158a, 158 can cooperate with the lower edges of these walls 32a, 32b.

Figure 9:
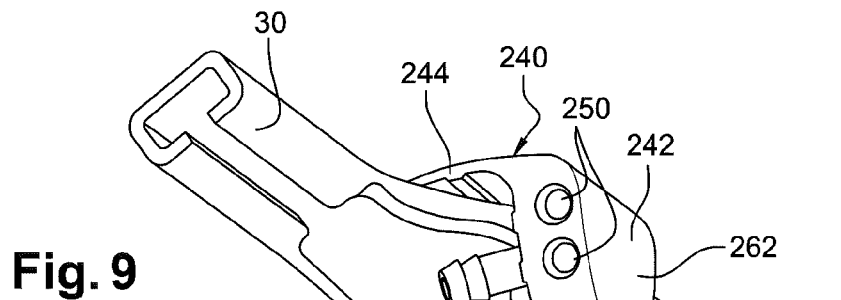
FIGS. 9 to 11 are schematic perspective views of an end piece of a window wiper arm and of a second embodiment of a device according to the invention.
Figure 10:
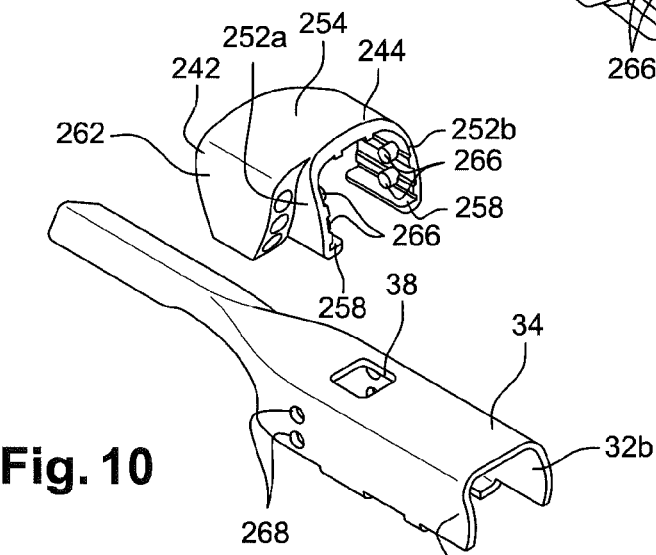
Figure 11:
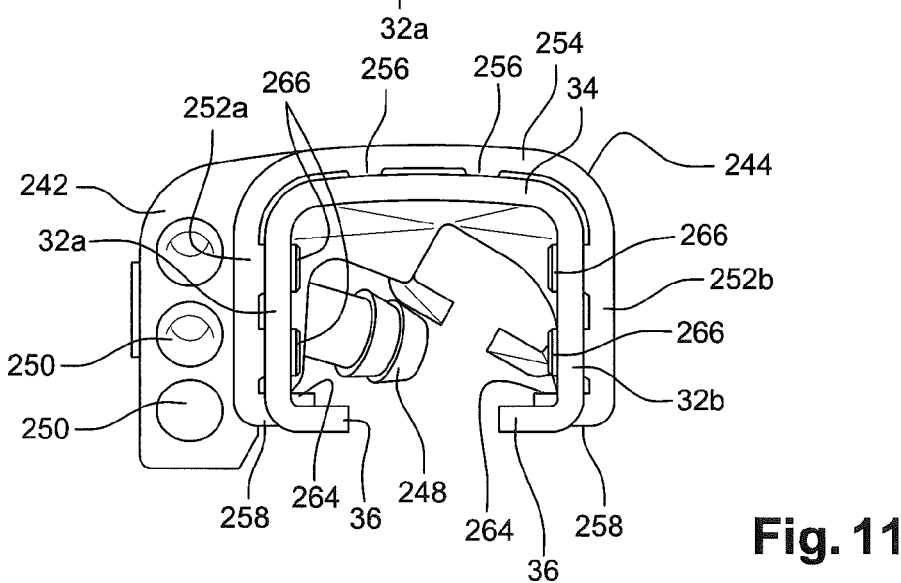

Reference is now made to FIGS. 9 to 11, which show a second embodiment of the invention. As indicated in the foregoing, the device 240 in FIGS. 9 to 11 has the features of the device 240, which features will therefore not be described in more detail in the following (with the exception of those relating to the hole 60).

Here the nozzle 242 is arranged on one side of the cover 244, and is applied and fastened to the outer lateral face of the lateral wall 252a of the cover 244. In this case it comprises a plurality of holes 250 for spraying liquid, which extend in substantially the same plane substantially parallel to the lateral wall 252a of the cover. The nozzle 242 extends over substantially the entire height of the cover 244 and is located on the opposite side to the aforesaid portion 30 of the piece 28. The nozzle 242 comprises an outer lateral face 262 that is substantially parallel to the wall 252a and on which a special marking can be provided, such as the brand name of the manufacturer or retailer (marked in relief here).

The device 240 is installed on the end piece 28 of the arm in such a way that the front or outer edges of its walls 252a, 252b, 254 are set back relative to those of the walls 32a, 32b, 34 of the end piece 28. It can be seen in FIG. 10 in particular that the profiles of the front edges of the walls 252a, 252b, 32a, 32b are substantially identical, these edges being substantially convexly curved inward.

Here the cover 244 does not comprise a hole aligned with the opening 38 in the piece 28 and is configured for location at the rear of this opening 38.

FIGS. 9 and 11 show in particular that the cannula 248 extends rearward and slightly downward from the nozzle 242. Its free end is located substantially below the front or outer end of the portion 30 of the end piece 28.

The aforesaid means 258 for arresting the device 240 on the end piece 28 comprise hooks in this case. Here each lateral wall 252a, 252b comprises a longitudinal hook. The hooks are located at the lower ends of the walls 252a, 252b. The hooks 258 are substantially symmetrical relative to a central longitudinal plane of the cover, which is substantially parallel to the walls 252a, 252b.

The hook 258 of each wall 252a, 252b is defined by a longitudinal ledge that extends on the side of the other wall 252b, 252a. Each hook comprises an upper bearing face 264.

In this case the hooks extend over substantially the entire length or axial dimension of their lower edges.

The hooks 258 are intended for engagement under the walls 32a, 32b of the end piece such that their bearing faces 264 cooperate with the lower longitudinal edges of these walls 32a, 32b.

As can be seen in FIG. 11 in particular, the lateral walls 32a, 32b of the end piece 28 extend substantially without play between the wall 254 and the hooks 258 of the device 240. This means the device 240 can be arrested on the end piece in the upward and downward transverse direction. It is the cooperation of the walls 252a, 252b of the cover with those 32a, 32b of the end piece that arrests the device 240 on either side of the end piece in transverse directions.

The lateral walls 252a, 252b of the device 240 further comprise arresting pins 266 that are engaged in holes 268 in the walls 32a, 32b of the piece 28.

The pins 266 are substantially cylindrical; there are four of them here.

Each wall 252a, 252b comprises two pins 266 that are located on the inner lateral face of the wall and extend on the side of the other wall 252b, 252a. The axis of each pin 266 is substantially perpendicular to the corresponding wall 252a, 252b. The pins 266 extend in substantially the same transverse plane substantially perpendicular to the walls 252a, 252b. The pins 266 of one wall 252a, 252b are substantially symmetrical relative to the pins 266 of the other wall 252b, 252a, relative to the aforesaid central plane.

The pins are configured for engagement in the holes 268, which have a substantially complementary shape. This means that the device 240 can be arrested on the piece.

The device 240 can be fastened to the end piece 28 by spreading the lateral walls 252a, 252b of its cover 244 and then by installing the device on the end piece until its upper wall 254 comes to rest, for example via its ribs 256, on the wall 34 of the piece 28. The force exerted on the device 240 to bring about the aforesaid spreading is then released so that its lateral walls 252a, 252b can come to rest, for example via their ribs 256, on the walls 32a, 32b of the piece 28, that their pins 266 can engage in the holes 268 in the walls 32a, 32b, and that their hooks 258 can cooperate with the lower edges of these walls 32a, 32b.

Figure 12:
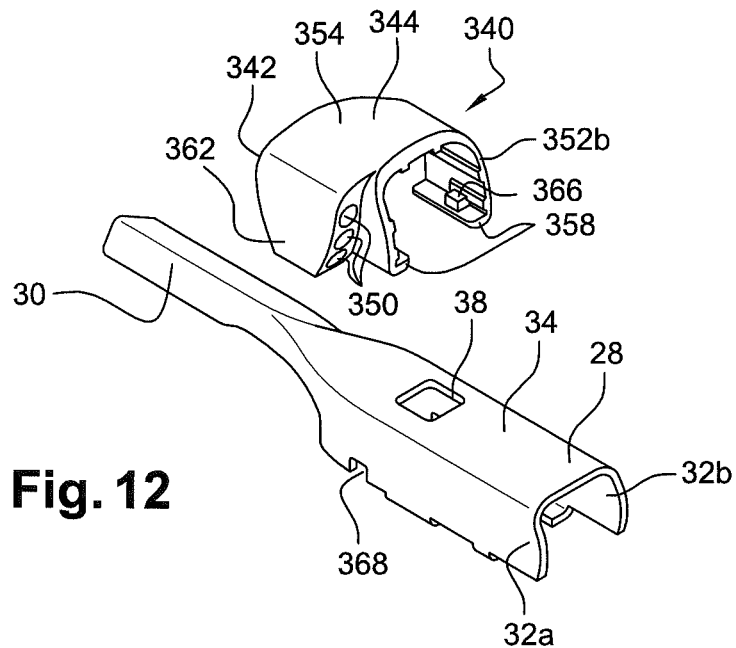
FIGS. 12 to 14 are schematic perspective views of an end piece of a window wiper arm and of a third embodiment of a device according to the invention.
Figure 13:
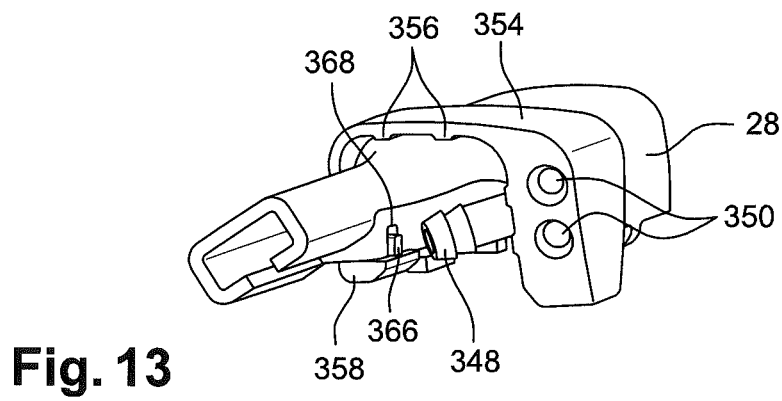
Figure 14:
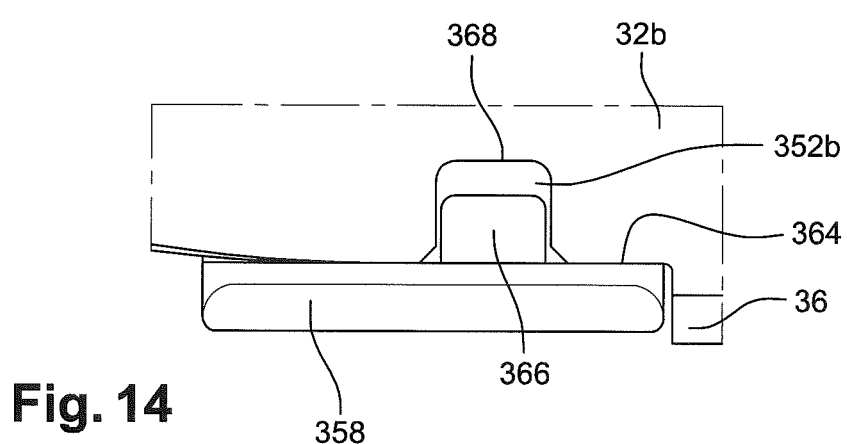

Reference is now made to FIGS. 12 to 14, which show a third embodiment of the invention. As indicated in the foregoing, the device 340 in FIGS. 12 to 14 has the features of the device 40, which features will therefore not be described in more detail in the following (with the exception of those relating to the hole 60).

Here the nozzle 342 is arranged on one side of the cover 344, and is applied and fastened to the outer lateral face of the lateral wall 352a of the cover 344. In this case it comprises a plurality of holes 350 for spraying liquid, which extend in substantially the same plane substantially parallel to the lateral wall 352a of the cover. The nozzle 342 extends over substantially the entire height of the cover 344 and is located on the opposite side to the aforesaid portion 30 of the piece 28. The nozzle 342 comprises an outer lateral face 362 that is substantially parallel to the wall 352a and on which a special marking can be provided, such as the brand name of the manufacturer or retailer (marked in relief here).

The device 340 is installed on the end piece 28 of the arm such that the front or outer edges of its walls 352a, 352b, 354 are set back relative to those of the walls 32a, 32b, 34 of the end piece 28. It can be seen in FIG. 12 in particular that the profiles of the front edges of the walls 352a, 352b, 32a, 32b are substantially identical, these edges being substantially convexly curved inward.

Here the cover 344 does not comprise a hole aligned with the opening 38 in the piece 28 and is configured for location at the rear of this opening 38.

FIG. 13 shows in particular that the cannula 348 extends rearward and slightly downward from the nozzle 342. Its free end is located substantially below the front or outer end of the portion 30 of the end piece 28.

The aforesaid means 358 for arresting the device 340 on the end piece 28 comprise hooks in this case. Here each lateral wall 352a, 352b comprises a longitudinal hook. The hooks are located at the lower ends of the walls 352a, 352b. The hooks 358 are substantially symmetrical relative to a central longitudinal plane of the cover, which is substantially parallel to the walls 352a, 352b.

The hook 358 of each wall 352a, 352b is defined by a longitudinal ledge that extends on the side of the other wall 352b, 352a. Each hook comprises an upper bearing face 364.

In this case the hooks extend over substantially the entire length or axial dimension of their lower edges.

The hooks 358 are intended for engagement under the walls 32a, 32b of the end piece such that their bearing faces 364 cooperate with the lower longitudinal edges of these walls 32a, 32b.

As can be seen in FIG. 13 in particular, the lateral walls 32a, 32b of the end piece 28 extend substantially without play between the wall 354 and the hooks 358 of the device 340. This means that the device 340 can be arrested on the end piece in the upward and downward transverse direction. It is the cooperation of the walls 352a, 352b of the cover with those 32a, 32b of the end piece that arrests the device 340 on either side of the end piece in the transverse direction.

The lateral walls 352a, 352b of the device 340 further comprise arresting pins 366 that are engaged in notches 368 in the walls 32a, 32b of the piece 28.

The pins 366 are substantially parallelepiped; there are two of them here.

Each wall 352a, 352b comprises a pin 366 that is located on the inner lateral face of the wall and extends on the side of the other wall 352b, 352a. The axis of each pin 366 is substantially perpendicular to the corresponding wall 352a, 352b. The pins 366 extend in substantially the same transverse plane substantially perpendicular to the walls 352a, 352b. The pins 366 are substantially symmetrical relative to the aforesaid central plane. In this case the pins 366 are located at the lower ends of the walls and are connected to the hooks 258.

The notches 368 have a complementary shape to that of the pins 366. Said notches are formed in the walls 32a, 32b of the end piece 28 and open out onto the lower edges of these walls.

The engagement of the pins 366 in the notches 368 means that the device 340 can be arrested on the piece in the longitudinal direction.

The device 340 can be fastened to the end piece 28 by spreading the lateral walls 352a, 352b of its cover 344 and then by installing the device on the end piece until its upper wall 354 comes to rest, for example via its ribs 356, on the wall 34 of the piece 28. The force exerted on the device 340 to bring about the aforesaid spreading is then released so that its lateral walls 352a, 352b can come to rest, for example by means of their ribs 356, on the walls 32a, 32b of the piece 28, that their pins 366 can engage in the notches 368 in the walls 32a, 32b, and that their hooks 358 can cooperate with the lower edges of the walls 32a, 32b.

Figure 15:
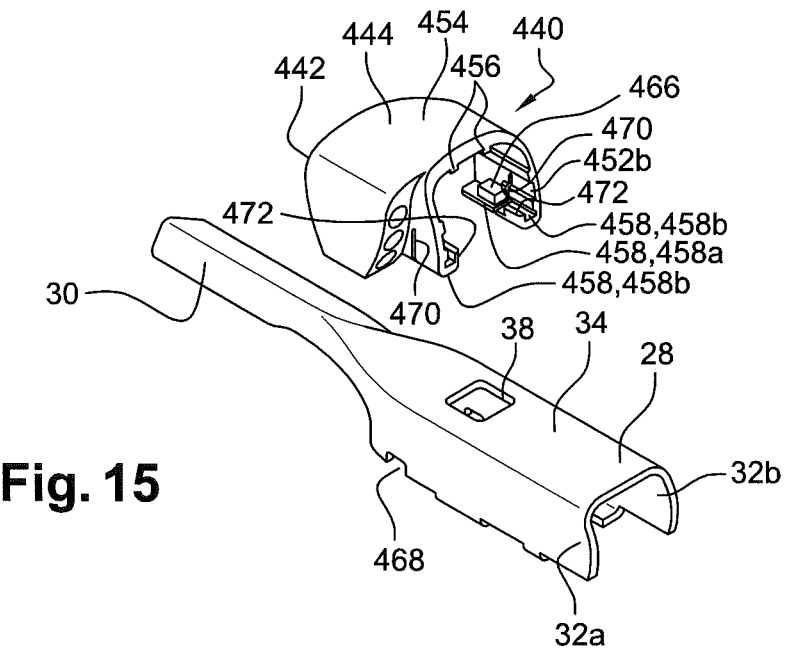
FIGS. 15 to 17 are schematic perspective views of an end piece of a window wiper arm and of a fourth embodiment of a device according to the invention.
Figure 16:
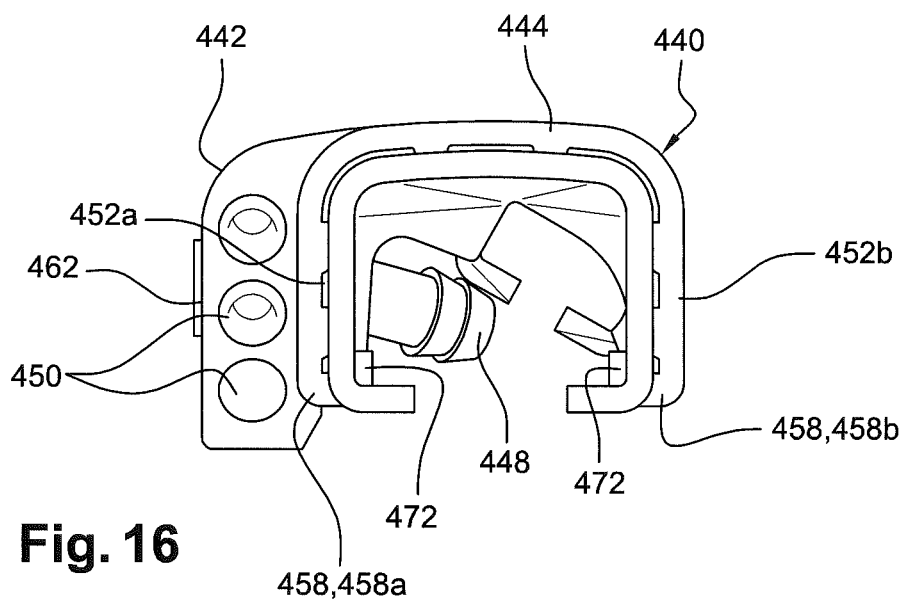
Figure 17:
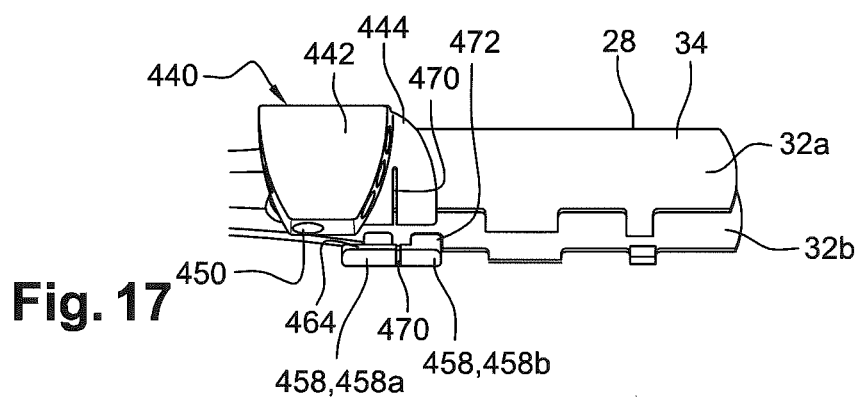

Reference is now made to FIGS. 15 to 17, which show a fourth embodiment of the invention. As indicated in the foregoing, the device 440 in FIGS. 15 to 17 has the features of the device 40, which features will therefore not be described in more detail in the following (with the exception of those relating to the hole 60).

Here the nozzle 442 is arranged on one side of the cover 444, and is applied and fastened to the outer lateral face of the lateral wall 452a of the cover 444. In this case it comprises a plurality of holes 450 for spraying liquid, which extend in substantially the same plane substantially parallel to the lateral wall 452a of the cover. The nozzle 442 extends over substantially the entire height of the cover 444 and is located on the opposite side to the aforesaid portion 30 of the piece 28. The nozzle 442 comprises an outer lateral face 462 that is substantially parallel to the wall 452a and on which a special marking can be provided, such as the brand name of the manufacturer or retailer (marked in relief here).

The device 440 is installed on the end piece 28 of the arm such that the front or outer edges of its walls 452a, 452b, 454 are set back relative to those of the walls 32a, 32b, 44 of the end piece 28. It can be seen in FIG. 12 in particular that the profiles of the front edges of the walls 452a, 452b, 32a, 32b are substantially identical, these edges being substantially convexly curved inward.

Here the cover 444 does not comprise a hole aligned with the opening 48 in the piece 28 and is configured for location at the rear of this opening 48.

FIG. 13 shows in particular that the cannula 448 extends rearward and slightly downward from the nozzle 442. Its free end is located substantially below the front or outer end of the portion 40 of the end piece 28.

The aforesaid means 458 for arresting the device 440 on the end piece 28 comprise hooks in this case. Here each lateral wall 452a, 452b comprises a longitudinal hook. The hooks are located at the lower ends of the walls 452a, 452b. The hooks 458 are substantially symmetrical relative to a central longitudinal plane of the cover, which is substantially parallel to the walls 452a, 452b.

The hook 458 of each wall 452a, 452b is defined by a longitudinal ledge that extends on the side of the other wall 452b, 452a. Each hook comprises an upper bearing face 464.

In this case the hooks extend over substantially the entire length or axial dimension of their lower edges.

The hooks 458 are intended for engagement under the walls 32a, 32b of the end piece such that their bearing faces 464 cooperate with the lower longitudinal edges of these walls 32a, 32b.

As can be seen in FIG. 13 in particular, the lateral walls 32a, 32b of the end piece 28 extend substantially without play between the wall 454 and the hooks 458 of the device 440. This means that the device 440 can be arrested on the end piece in the upward and downward transverse direction. It is the cooperation of the walls 452a, 452b of the cover with those 32a, 32b of the end piece that arrests the device 440 on either side of the end piece in the transverse direction.

The lateral walls 452a, 452b of the device 440 further comprise arresting pins 466 that are engaged in notches 468 in the walls 32a, 32b of the piece 28.

The pins 466 are substantially parallelepiped; there are two of them here.

Each wall 452a, 452b comprises a pin 466 that is located on the inner lateral face of the wall and extends on the side of the other wall 452b, 452a. The axis of each pin 466 is substantially perpendicular to the corresponding wall 452a, 452b. The pins 466 extend in substantially the same transverse plane substantially perpendicular to the walls 452a, 452b. The pins 466 are substantially symmetrical relative to the aforesaid central plane. In this case the pins 466 are located at the lower ends of the walls and hooks 458 are connected.

The notches 468 have a complementary shape to that of the pins 466. Said notches are formed in the walls 32*a*, 32*b* of the end piece 28 and open out onto the lower edges of these walls.

The engagement of the pins 466 in the notches 468 means that the device 440 can be arrested on the piece in the longitudinal direction.

In the example shown, the walls 452*a*, 452*b* each comprise a through-slit 470. The slits 470 extend in a transverse plane substantially perpendicular to the walls 452*a*, 452*b*. They each define a front wall portion and a rear wall portion. The front wall portions comprise the pins 466 and front portions 458*a* of the hooks 458, and their rear portions comprise rear portions 458*b* of the hooks 458.

The rear portions 458*b* of the hooks comprise, at their free transverse ends, guiding teeth 472. The guiding tooth 472 of each portion 458*b* extends in the longitudinal direction over a portion of the inner transverse edge of the portion 458*b*. Each tooth extends upward. Each tooth 472 is substantially perpendicular to the hook 458 and thus substantially parallel to the corresponding lateral wall 452*a*, 452*b*. Together with the lateral walls 452*a*, 452*b*, the teeth 472 define longitudinal spaces for installing and guiding the lower longitudinal edges of the walls 32*a*, 32*b*.

The device 440 can be fastened to the end piece 28 by positioning it so as to straddle the rear portion 30 thereof. The device is then moved in the longitudinal direction toward the front of the piece 28 so that the lower longitudinal edges of the walls 32*a*, 32*b* engage in the aforesaid spaces defined between the teeth 472 and the walls 452*a*, 452*b*. This operation may not require spreading of the front portions of the walls 452*a*, 452*b*. The rear portions of the walls 452*a*, 452*b* are then spread in order to proceed with installation of the device on the piece 28 by longitudinal translation. The force exerted on the device 440 to bring about the aforesaid spreading is then released so that in particular the pins 466 can engage in the notches 468 in the walls 32*a*, 32*b* and that their hooks 458 can cooperate with the lower edges of the walls 32*a*, 32*b* of the piece 28.

Figure 18:
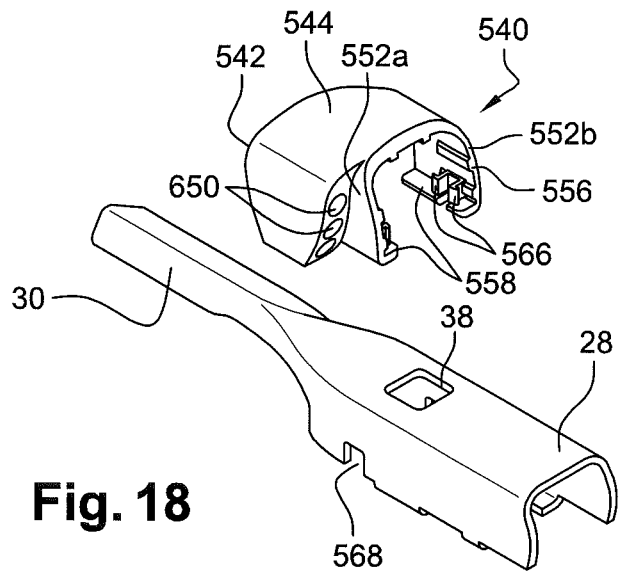
FIGS. 18 to 20 are schematic perspective views of an end piece of a window wiper arm and of a fifth embodiment of a device according to the invention.
Figure 19:
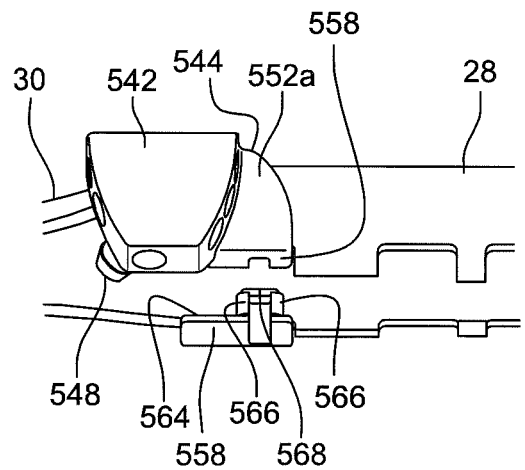
Figure 20:
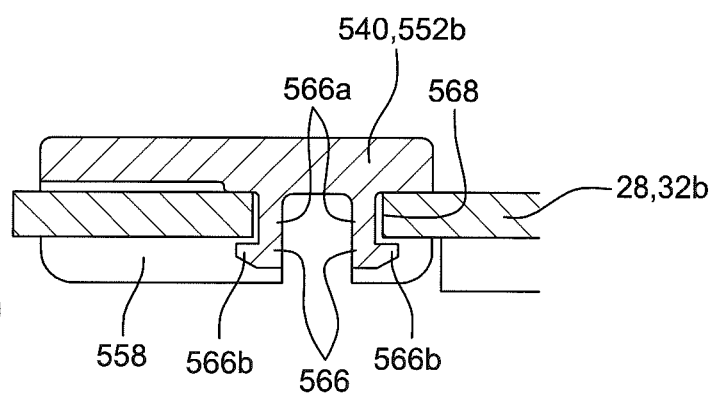
Figure 24:
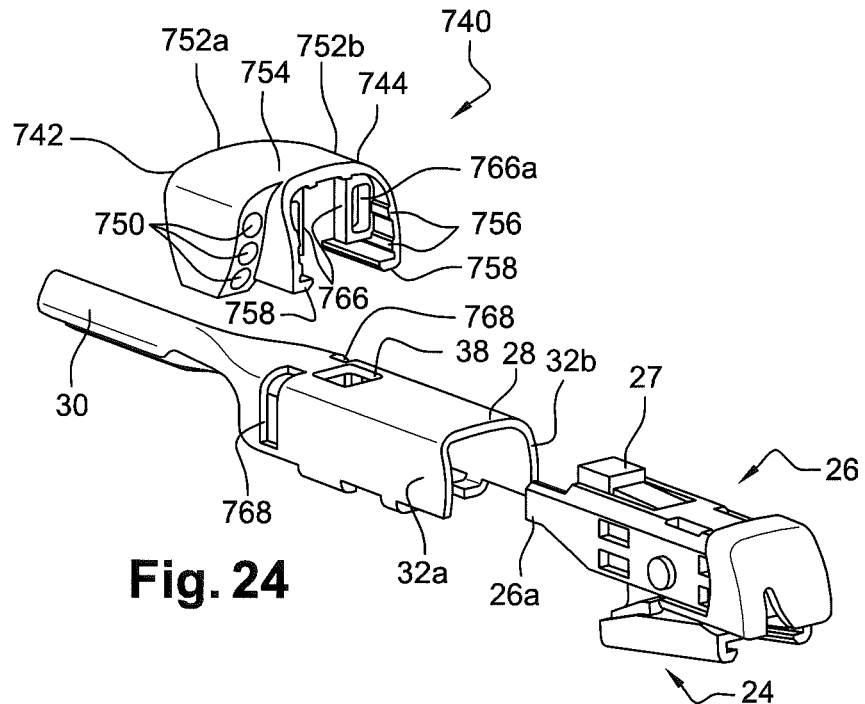
FIGS. 24 to 26 are schematic perspective views of an end piece of a window wiper arm and of a seventh embodiment of a device according to the invention.

Reference is now made to FIGS. 18 to 20, which show a fifth embodiment of the invention. As indicated in the foregoing, the device 540 in FIGS. 18 to 20 has the features of the device 40, which features will therefore not be described in more detail in the following (with the exception of those relating to the hole 60).

Here the nozzle 542 is arranged on one side of the cover 544, and is applied and fastened to the outer lateral face of the lateral wall 552*a* of the cover 544. In this case it comprises a plurality of holes 550 for spraying liquid, which extend in substantially the same plane substantially parallel to the lateral wall 552*a* of the cover. The nozzle 542 extends over substantially the entire height of the cover 544 and is located on the opposite side to the aforesaid portion 50 of the piece 28. The nozzle 542 comprises an outer lateral face 562 that is substantially parallel to the wall 552*a* and on which a special marking can be provided, such as the brand name of the manufacturer or retailer (marked in relief here).

The device 540 is installed on the end piece 28 of the arm such that the front or outer edges of its walls 552*a*, 552*b*, 554 are set back relative to those of the walls 32*a*, 32*b*, 54 of the end piece 28. It can be seen in FIG. 18 in particular that the profiles of the front edges of the walls 552*a*, 552*b*, 32*a*, 32*b* are substantially identical, these edges being substantially convexly curved inward.

This cover 544 does not comprise a hole aligned with the opening 58 in the piece 28 and is configured for location at the rear of this opening 58.

FIG. 19 shows in particular that the cannula 548 extends rearward and slightly downward from the nozzle 542. Its free end is located substantially below the front or outer end of the portion 30 of the end piece 28.

The aforesaid means 558 for arresting the device 540 on the end piece 28 comprise hooks in this case. Here each lateral wall 552*a*, 552*b* comprises a longitudinal hook. The hooks are located at the lower ends of the walls 552*a*, 552*b*. The hooks 558 are substantially symmetrical relative to a central longitudinal plane of the cover, which is substantially parallel to the walls 552*a*, 552*b*.

The hook 558 of each wall 552*a*, 552*b* is defined by a longitudinal edge that extends on the side of the other wall 552*b*, 552*a*. Each hook comprises an upper bearing face 564.

In this case the hooks extend over substantially the entire length or axial dimension of their lower edges.

The hooks 558 are intended for engagement under the walls 32*a*, 32*b* of the end piece such that their bearing faces 564 cooperate with the lower longitudinal edges of these walls 32*a*, 32*b*.

As can be seen in FIG. 13 in particular, the lateral walls 32*a*, 32*b* of the end piece 28 extend substantially without play between the wall 554 and the hooks 558 of the device 540. This means that the device 540 can be arrested on the end piece in the upward and downward transverse direction. It is the cooperation of the walls 552*a*, 552*b* of the cover with those 32*a*, 32*b* of the end piece that arrests the device 540 on either side of the end piece in the transverse direction.

The lateral walls 552*a*, 552*b* of the device 540 further comprise arresting tabs 566, which are resiliently deformable and engaged by resilient latching in notches 568 in the walls 32*a*, 32*b* of the piece 28.

There are four tabs 566 here. Each tab 566 is generally L-shaped and comprises a first branch 566*a* of which one end is connected to the corresponding wall 552*a*, 552*b* and the other end is connected to a second branch forming a hooking tooth 566*b*.

Each wall 552*a*, 552*b* comprises two tabs 566, which are located on the inner lateral face of the wall and extend on the side of the other wall 552*b*, 552*a*. Each wall 552*a*, 552 comprises a front tab and a rear tab.

The first branches 566*a* of the tabs 566 are substantially perpendicular to the corresponding wall 552*a*, 552*b* and their hooking teeth 566*b* are substantially parallel to the walls 552*a*, 552*b*. The teeth of the tabs 566 of the same wall 552*a*, 552*b* are oriented longitudinally and in opposite directions. Thus, the front tab has its tooth 566*b* which faces the front and the rear tab has its tooth which faces the rear.

The tabs 566 of one wall 552*a*, 552*b* are substantially symmetrical relative to the tabs of the other wall 552*b*, 552*a*, relative to the aforesaid central plane. The tabs 566 are in this case located at the lower ends of the walls and connected or otherwise to hooks 258.

Here each hook 558 is slit in the transverse direction, from the bottom to the top. In this case, the slit in each hook 558 opens out between the tabs to facilitate their deformation, and in particular their closing-in.

The notches 568 have a complementary shape to that of the pins 566. Said notches are formed in the walls 32*a*, 32*b* of the end piece 28 and open out onto the lower edges of these walls.

The engagement of the tabs 566 in the notches 568 means that the device 540 can be arrested on the piece in the longitudinal direction.

The device 540 can be fastened to the end piece 28 by spreading the lateral walls 552*a*, 552*b* of its cover 544 and then by installing the device on the end piece until its upper wall 554 comes to rest, for example via its ribs 556, on the wall 54 of the piece 28. The force exerted on the device 540 to bring about the aforesaid spreading is then released so that its lateral walls 552*a*, 552*b* can come to rest, for example via their ribs 556, on the walls 32*a*, 32*b* of the piece 28, that their tabs 566 can engage by resilient latching in the notches 568 in the walls 32*a*, 32*b* (their teeth then facing the inner lateral faces of the walls 32*a*, 32*b*, as can be seen in FIGS. 19 and 20), and that their hooks 558 can cooperate with the lower edges of the walls 32*a*, 32*b* of the piece 28.

Reference is now made to FIGS. 21 to 23, which show a sixth embodiment of the invention. As indicated in the foregoing, the device 640 in FIGS. 21 to 23 has the features of the device 40, which features will therefore not be described in more detail in the following (with the exception of those relating to the hole 60).

Here the nozzle 642 is arranged on one side of the cover 644, and is applied and fastened to the outer lateral face of the lateral wall 652*a* of the cover 644. In this case it comprises a plurality of holes 650 for spraying liquid, which extend in substantially the same plane substantially parallel to the lateral wall 652*a* of the cover. The nozzle 642 extends over substantially the entire height of the cover 644 and is located on the opposite side to the aforesaid portion 30 of the piece 28. The nozzle 642 comprises an outer lateral face 662 that is substantially parallel to the wall 652*a* and on which a special marking can be provided, such as the brand name of the manufacturer or retailer (marked in relief here).

The device 640 is installed on the end piece 28 of the arm such that the front or outer edges of its walls 652*a*, 652*b*, 654 are set back relative to those of the walls 32*a*, 32*b*, 34 of the end piece 28. It can be seen in FIG. 18 in particular that the profiles of the front edges of the walls 652*a*, 652*b*, 32*a*, 32*b* are substantially identical, these edges being substantially convexly curved inward.

This cover 644 does not comprise a hole aligned with the opening 68 in the piece 28 and is configured for location at the rear of this opening 68.

FIG. 19 shows in particular that the cannula 648 extends rearward and slightly downward from the nozzle 642. Its free end is located substantially below the front or outer end of the portion 30 of the end piece 28.

The aforesaid means 658 for arresting the device 640 on the end piece 28 comprise hooks in this case. Here each lateral wall 652*a*, 652*b* comprises a longitudinal hook. The hooks are located at the lower ends of the walls 652*a*, 652*b*. The hooks 658 are substantially symmetrical relative to a central longitudinal plane of the cover, which is substantially parallel to the walls 652*a*, 652*b*.

The hook 658 of each wall 652*a*, 652*b* is defined by a longitudinal ledge that extends on the side of the other wall 652*b*, 652*a*. Each hook comprises an upper bearing face 664.

In this case the hooks extend over substantially the entire length or axial dimension of their lower edges.

The hooks 658 are intended for engagement under the walls 32*a*, 32*b* of the end piece such that their bearing faces 664 cooperate with the lower longitudinal edges of these walls 32*a*, 32*b*.

As can be seen in FIG. 13 in particular, the lateral walls 32*a*, 32*b* of the end piece 28 extend substantially without play between the wall 654 and the hooks 658 of the device 640. This means that the device 640 can be arrested on the end piece in the upward and downward transverse direction. It is the cooperation of the walls 652*a*, 652*b* of the cover with those 32*a*, 32*b* of the end piece that arrests the device 640 on either side of the end piece in the transverse direction.

The lateral walls 652*a*, 652*b* of the device 640 further comprise arresting tabs 666 that are retractable in this case and engaged by resilient latching in holes 668 in the walls 32*a*, 32*b* of the piece 28.

There are two tabs 666 here. Each tab 666 is generally U-shaped and comprises two branches 666*a*, 666*b* that are interconnected by a central portion 666*c*. The tabs 666 are substantially symmetrical relative to the aforesaid central plane.

Each tab 666 is connected to a lateral wall 652*a*, 652*b* by a thin film 674 forming a hinge. The branch 666*a* has its free end, which is connected by the thin film 674 to a lower longitudinal edge of the corresponding lateral wall 652*a*, 652*b*. The free end of the other branch 666*b* is connected to a hooking tooth 666*d*.

The thin films 674 are designed so that the tabs are retractable in a transverse plane substantially perpendicular to the walls 652*a*, 652*b*. They are retractable from a lower position where they extend freely below the walls 652*a*, 652*b* (FIGS. 21 and 22) to an upper position in which their teeth 66*d* are engaged by resilient latching in the holes 668 in the walls 32*a*, 32*b* of the piece 28 (FIG. 23). To reach this position, each tab is moved in rotation about a pivot axis defined by the corresponding thin film 674. The pivot axes of the tabs are substantially parallel and in this case have a substantially longitudinal orientation. It can be seen in the drawings that the walls 652*a*, 652*b* of the device 640 comprise holes 676 for receiving the teeth 666*d* of the tabs 666 after their resilient latching.

Each hook 658 is split here. The slit in each hook 658 opens out in the region of a tab 666, and in particular of its thin film 674, to allow it to be retracted as shown in the drawings.

The retraction of the tabs 666 and the engagement of their teeth 666*d* in the holes in the walls 32*a*, 32*b* of the piece 28 arrests the device 640 in all directions.

The device 640 can be fastened to the end piece 28 by spreading the lateral walls 652*a*, 652*b* of its cover 644 and then by installing the device on the end piece until its upper wall 654 comes to rest, for example via its ribs 656, on the wall 64 of the piece 28. The force exerted on the device 640 to bring about the aforesaid spreading is then released so that its lateral walls 652*a*, 652*b* can come to rest, for example via their ribs 656, on the walls 32*a*, 32*b* of the piece 28, and that their hooks 658 can cooperate with the lower edges of the walls 32*a*, 32*b* of the piece 25. The tabs 666 are then retracted until their teeth latch resiliently in the holes 668 in the walls 32*a*, 32*b* of the piece.

Reference is now made to FIGS. 24 to 29, which show a seventh embodiment of the invention. As indicated in the foregoing, the device 740 in FIGS. 24 to 29 has the features of the device 40, which features will therefore not be described in more detail in the following (with the exception of those relating to the hole 60).

Here the nozzle 742 is arranged on one side of the cover 744, and is applied and fastened to the outer lateral face of the lateral wall 752*a* of the cover 744. In this case it comprises a plurality of holes 750 for spraying liquid, which extend in substantially the same plane substantially parallel to the lateral wall 752*a* of the cover. The nozzle 742 extends over substantially the entire height of the cover 744 and is located on the opposite side to the aforesaid portion 70 of the piece 28. The nozzle 742 comprises an outer lateral face 762 that is substantially parallel to the wall 752a and on which a special marking can be provided, such as the brand name of the manufacturer or retailer (marked in relief here).

The device 740 is installed on the end piece 28 of the arm such that the front or outer edges of its walls 752a, 752b, 754 are set back relative to those of the walls 32a, 32b, 34 of the end piece 28. It can be seen in FIGS. 24 and 25 in particular that the profiles of the front edges of the walls 752a, 752b, 32a, 32b are substantially identical, these edges being substantially convexly curved inward.

Here the cover 744 does not comprise a hole aligned with the opening 38 in the piece 28 and is configured for location at the rear of this opening 38.

Figure 25:
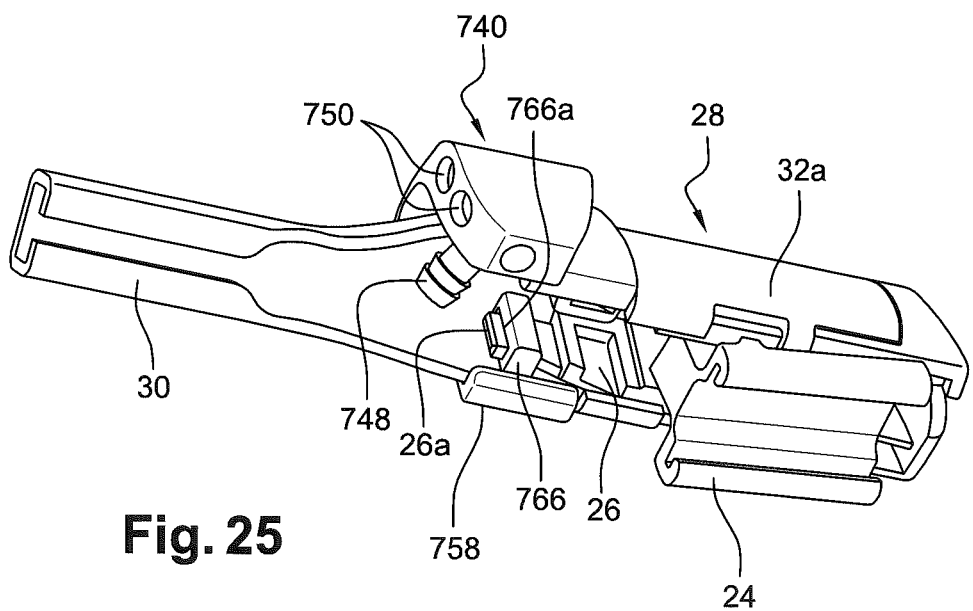

FIG. 25 shows in particular that the cannula 748 extends rearward and slightly downward from the nozzle 742. Its free end is located substantially below the front or outer end of the portion 70 of the end piece 28.

The aforesaid means 758 for arresting the device 740 on the end piece 28 comprise hooks in this case. Here each lateral wall 752a, 752b comprises a longitudinal hook. The hooks are located at the lower ends of the walls 752a, 752b. The hooks 758 are substantially symmetrical relative to a central longitudinal plane of the cover, which is substantially parallel to the walls 752a, 752b.

The hook 758 of each wall 752a, 752b is defined by a longitudinal ledge that extends on the side of the other wall 752b, 752a. Each hook comprises an upper bearing face 764.

In this case the hooks extend over substantially the entire length or axial dimension of their lower edges.

The hooks 758 are intended for engagement under the walls 32a, 32b of the end piece such that their bearing faces 764 cooperate with the lower longitudinal edges of these walls 32a, 32b.

The lateral walls 32a, 32b of the end piece 28 extend substantially without play between the wall 754 and the hooks 758 of the device 740. This means that the device 740 can be arrested on the end piece in the upward and downward transverse direction. It is the cooperation of the walls 752a, 752b of the cover with those 32a, 32b of the end piece that arrests the device 740 on either side of the end piece in the transverse direction.

The lateral walls 752a, 752b of the device 740 further comprise arresting flanges 766 in this case engaged in notches 768 in the piece 28, these notches 768 extending in the walls 32a, 32b, 34.

The flanges 766 are substantially parallelepiped; there are two of them here.

Figure 27:
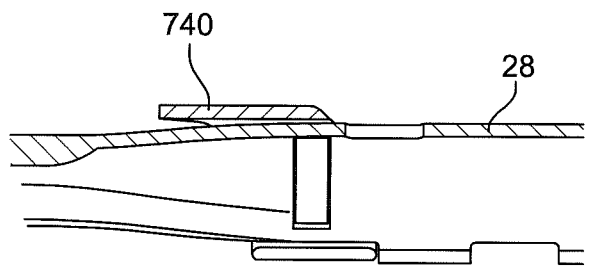
FIGS. 27 to 29 are schematic longitudinal sections of the end piece and of the device in FIGS. 24 to 26, and of an adapter installed on a window wiper blade for FIGS. 28 and 29.

Each wall 752a, 752b comprises a flange 766 that is located on the inner lateral face of the wall and extends on the side of the other wall 752b, 752a. Each flange 766 is substantially perpendicular to the corresponding wall 752a, 752b. The flanges 766 extend in substantially the same transverse plane substantially perpendicular to the wall 752a, 752b. The flanges 766 are substantially symmetrical relative to the aforesaid central plane. The flanges 766 extend over substantially the entire height of the walls 752a, 752b in this case. However, they are not connected to the hooks 758, as can be seen in FIG. 27 in particular.

The notches 768 have a complementary shape to that of the flanges 766. They are formed in the walls 32a, 32b of the end piece 28 and open out onto the upper edges of these walls. They do not open out onto the lower edges of these walls 32a, 32b.

The engagement of the flanges 766 in the notches 768 means that the device 740 can be arrested on the piece in the longitudinal direction. Moreover, the flanges 766 comprise through-openings 766a in the longitudinal direction that are configured to receive complementary means of the adapter 26.

In the example shown, the adapter 26 comprises at its downstream end two lateral lugs 26a configured to engage in the openings 766a in the flanges.

The lugs 26a are substantially parallel and extend in planes that are substantially parallel to the walls 32a, 32b of the piece 28. In the installation position, the lugs 26a extend close to the walls 32a, 32b and can even contact or rest on the inner faces thereof.

Figure 26:
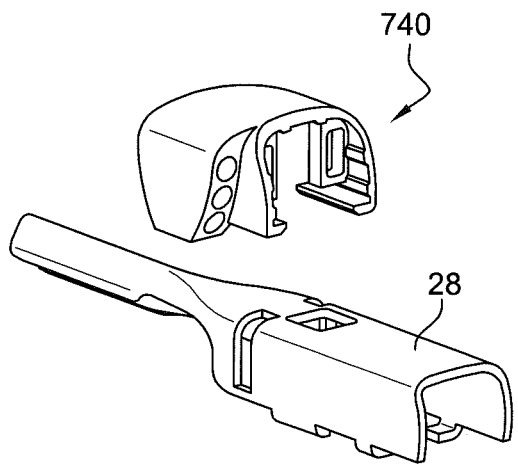
Figure 28:
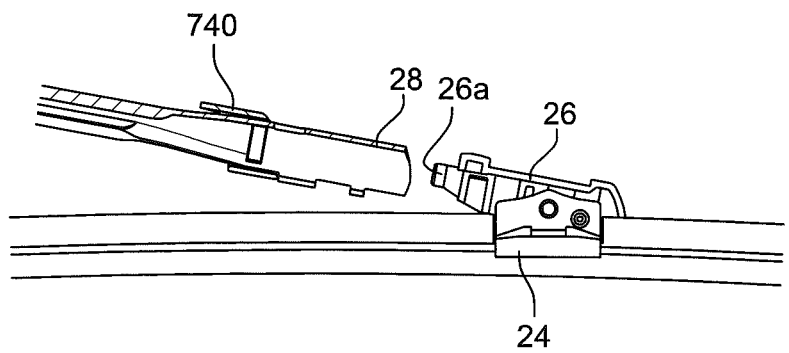
Figure 29:
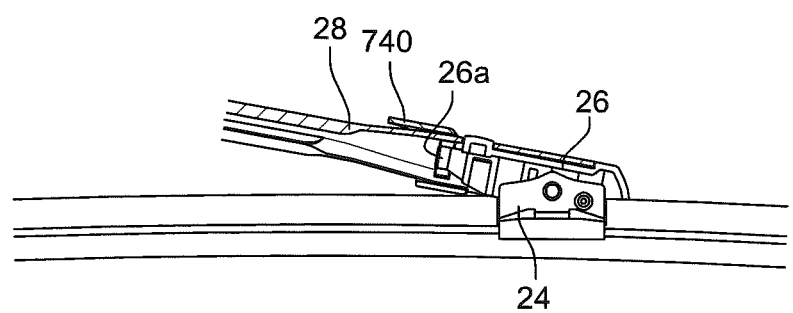

The device 740 can be fastened to the end piece 28 by spreading the lateral walls 752a, 752b of its cover 744. The device 740 is installed on the end piece 28 such that its upper wall 754 comes to rest, for example via its ribs 756, on the wall 34 of the piece 28 and that its flanges 766 engage and slide in the notches 768 (FIGS. 26 and 27). The force exerted on the device 740 to bring about the aforesaid spreading is then released so that its lateral walls 752a, 752b can come to rest, for example via their ribs 756, on the walls 32a, 32b of the piece 28, and that their hooks 758 can cooperate with the lower edges of the walls 32a, 32b of the piece 28. The adapter 26 is then installed in the piece 28 such that its lugs 26 engage in the openings 766a in the flanges (FIGS. 28 and 29).

The invention claimed is:

1. A window wiper, comprising a wiper arm comprising a substantially U-shaped end piece having a substantially U-shaped cross section, the end piece comprising walls, the walls being substantially parallel and interconnected by an upper transverse wall, the upper transverse wall being substantially perpendicular to each wall, wherein the wiper arm bears a device that is applied and fastened to said end piece; the device comprising a substantially U-shaped cover and an accessory; the accessory comprising a nozzle having at least one hole which sprays liquid in a direction away from the arm; the cover having a substantially U-shaped cross section, a concave interior surface housing a convex exterior surface of the end piece, and lateral walls which are substantially parallel and interconnected by an upper transverse wall, the upper transverse wall being substantially perpendicular to each lateral wall, the lateral walls comprising arresting means comprising longitudinal hooks, the hooks being located on a lower free end of each lateral wall, the hooks being substantially perpendicular to the remainder of the respective lateral wall, the hooks being substantially parallel to the upper transverse wall of the device, and the hooks comprising bearing faces which engage under the walls of the end piece and cooperate with lower longitudinal edges of the walls.

2. The window wiper according to claim 1, wherein said cover comprises a through-hole configured for alignment with an opening in said arm.

3. The window wiper according to claim 1, wherein said arresting means are arresting means in longitudinal and transverse directions.

4. The window wiper according to claim 1, wherein said arresting means are configured to cooperate with an adapter borne by the arm and engaged in the end piece of the arm.

5. The window wiper according to claim 1, wherein the hooks are resiliently deformable, and are configured to cooperate by resilient latching with the end piece of the arm.

6. The window wiper according to claim 1, wherein the hooks are retractable from a position in which the device is locked with respect to the end piece to an unlocking position.

7. The window wiper according to claim 2, wherein said through-hole is formed in said upper transverse wall.

8. The window wiper according to claim 2, wherein lateral walls of the cover comprise through-slits that extend in at least one plane that is substantially perpendicular to said lateral walls.

* * * * *